United States Patent
Gupta et al.

(10) Patent No.: US 9,699,049 B2
(45) Date of Patent: Jul. 4, 2017

(54) PREDICTIVE MODEL FOR ANOMALY DETECTION AND FEEDBACK-BASED SCHEDULING

(71) Applicant: eBay Inc., San Jose, CA (US)

(72) Inventors: Chaitali Gupta, Sunnyvale, CA (US); Mayank Bansal, San Jose, CA (US); Tzu-Cheng Chuang, San Jose, CA (US); Ranjan Sinha, San Jose, CA (US); Sami Ben-Romdhane, San Jose, CA (US)

(73) Assignee: eBay Inc., San Jose, CA (US)

( * ) Notice: Subject to any disclaimer, the term of this patent is extended or adjusted under 35 U.S.C. 154(b) by 149 days.

(21) Appl. No.: 14/586,381

(22) Filed: Dec. 30, 2014

(65) Prior Publication Data
US 2016/0088006 A1    Mar. 24, 2016

Related U.S. Application Data

(60) Provisional application No. 62/054,248, filed on Sep. 23, 2014.

(51) Int. Cl.
*H04L 12/26* (2006.01)
*H04L 12/24* (2006.01)
*G06N 99/00* (2010.01)

(52) U.S. Cl.
CPC .......... *H04L 43/08* (2013.01); *H04L 41/0896* (2013.01); *H04L 41/142* (2013.01); *H04L 41/147* (2013.01); *H04L 41/16* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 8,018,860 B1* | 9/2011 | Cook | H04L 41/145 370/218 |
| 8,995,249 B1* | 3/2015 | Roy | H04L 41/147 370/216 |
| 2001/0051862 A1* | 12/2001 | Ishibashi | H04L 41/145 703/14 |
| 2012/0020216 A1* | 1/2012 | Vashist | H04L 41/14 370/235 |
| 2012/0197609 A1* | 8/2012 | Wu | G06Q 10/04 703/2 |
| 2016/0028599 A1* | 1/2016 | Vasseur | H04L 41/16 370/252 |
| 2016/0072726 A1* | 3/2016 | Soni | H04L 47/762 709/208 |
| 2016/0359683 A1* | 12/2016 | Bartfai-Walcott | H04L 41/22 |
| 2017/0019307 A1* | 1/2017 | Brooks | H04N 7/1675 |

* cited by examiner

*Primary Examiner* — Michael R Vaughan
(74) *Attorney, Agent, or Firm* — Schwegman Lundberg & Woessner, P.A.

(57) ABSTRACT

In an example embodiment, clusters of nodes in a network are monitored. Then the monitored data may be stored in an open time-series database. Data from the open time-series database is collected and labeled it as training data. Then a model is built through machine learning using the training data. Additional data is retrieved from the open time-series database. The additional data is left as unlabeled. Anomalies in the unlabeled data are computed using the model, producing prediction outcomes and metrics. Finally, the prediction outcomes and the network.

20 Claims, 16 Drawing Sheets

PREDICTIVE MODEL FOR ANOMALY DETECTION AND FEEDBACK-BASED SCHEDULING

PRIORITY

This application is a Non-Provisional of and claims the benefit of priority under 35 U.S.C. §119(e) from U.S. Provisional Application Ser. No. 62/054,248, filed on Sep. 23, 2014 which is hereby incorporated by reference herein in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2013, All Rights Reserved.

TECHNICAL FIELD

The present disclosure relates generally to detecting anomalies in computer server clusters.

BACKGROUND

In recent years, Hadoop has become the most popular distributed systems platform of choice in both industry and academia, used to distribute computing tasks among a number of different servers. A Hadoop cluster is a special type of computational cluster designed specifically for storing and analyzing large amounts of unstructured data in a distributed computing environment. Hadoop relies on Hadoop Distributed File System (HDFS) to store peta-bytes of data and runs massively parallel MapReduce programs to access them. MapReduce is inspired by functional programming model, and runs "map" and "reduce" tasks on multiple server machines in a cluster. A map function, provided by a user, divides input data into multiple chunks, produces intermediate results. Reduce functions generate final output from the intermediate results produced by these map functions and stores them in the cluster.

Hadoop is widely deployed in industry and academia. In academia, scientists have enabled Hadoop clusters to generate and analyze data at a larger scale than was ever possible before. Today, scientists in a variety of disciplines such as earthquake simulations, bioinformatics, climate science, and astrophysics, are able to simulate and experiment on petabytes of data.

Around the Hadoop ecosystem, a number of programming paradigms, applications, and services have evolved lately, including stream processing and analytics and real-time graph processing to name a few. Many users running applications on Hadoop often times have hard deadlines on the finish time of their applications. Therefore, the Hadoop cluster providers strive for availability and responsiveness. System administrators have a daunting task of monitoring each individual node in the cluster for its health so that responsiveness and availability requirements of the users are met at all times. There are a number of systems and tools available to the system administrators that provide visual outputs of system monitoring parameters; however they often times raise an alarm at a time when the whole cluster is already impacted. The impact affects workloads running in the cluster, lowering throughput of the cluster significantly. Therefore, there is a need to develop a system that can predict failures or anomalies in advance and self-remediate the cluster before it becomes inoperable. The main advantage of such system is that the early detection of anomaly can be notified to the core Hadoop system for self-remediation purposes, alleviating the probability of a possible failure. In an example embodiment, a Hadoop scheduler can take advantage of the early-detection for better workload scheduling as one of the self-remediation mechanisms.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

Figure 1:
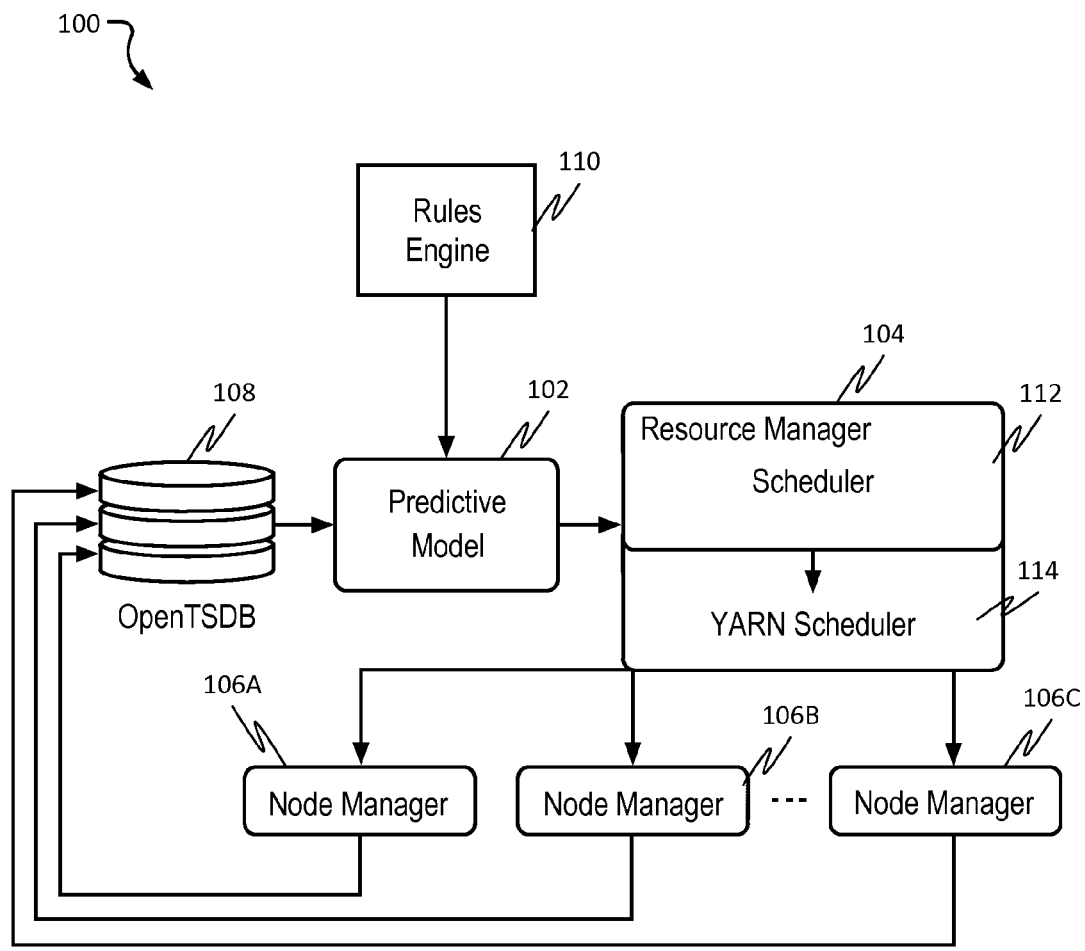
FIG. 1 is an architecture diagram of a system in accordance with an example embodiment.

Example methods and systems for a predictive model for anomaly detection and feedback based scheduling are provided. In the following description, for purposes of explanation, numerous specific details are set forth in order to provide a thorough understanding of example embodiments. It will be evident, however, to one skilled in the art that the present invention may be practiced without these specific details.

In an example embodiment, a predictive model for anomaly detection and feedback based scheduling is provided. In an example embodiment, machine-learning based predictive models are used to diagnose cluster anomalies and a scheduler takes advantage of model feedback for better workload scheduling. The system may collect data from a time-series data from a system and applies machine-learning algorithms to predict cluster behavior. It generates a health score to determine cluster health. The scheduler may use the model output and decide whether it needs to move or reduce workloads from the problematic nodes. In experimental results with a prototype of an example embodiment, the results demonstrate that the scheduler improves cluster utilization significantly.

In an example embodiment, the core of system contains a predictive model and an extension to the Hadoop scheduler. The predictive model takes into account time-series data of varied systems level and Hadoop cluster-level metrics and raises alarms when an anomaly is detected. The predictive model may also be capable of identifying major metrics that contribute to the anomaly in the cluster and providing this information to the scheduler. The scheduler uses this information for better workload scheduling.

The current version of Hadoop scheduler, YARN, has capability to reschedule a slow-running job in the cluster, but they are triggered after a time when running workloads miss their "service-level agreements (SLA)". Also, the current implementation of YARN only considers CPU and memory as cluster resources for scheduling purposes. Therefore, the scheduler is oblivious to other types of errors in a node such as bad disks, slow I/Os, ports etc. If problems occur in any of these resources of a node, the scheduler remains unaware and allocates compute resources to that node, making the cluster slower. An example embodiment described herein overcomes the limitation by using knowledge from the predictive model and taking this into consideration for scheduling decisions.

In an example embodiment, a predictive and feedback-based system is provided. The system two major components—a predictive model and a scheduler. The predictive model collects data from time-series database. The nodes in the cluster generate the data at every periodic interval. The predictive model may run machine-learning based algorithms and output a "score" for each node at every time intervals. The score indicates whether any node in the cluster has a possibility of going anomalous in near future or not. The outputs from the model are then propagated to the scheduler using, for example, Scheduler Feedback Language (SFL). The scheduler extension also can support a pull model, wherein it requests for scores from the predictive model using a REST API. The scheduler then checks scores of each node and makes scheduling decision for the future workloads in the cluster.

In the following section, a detailed architecture of each individual component of the system is provided.

FIG. 1 is an architecture diagram of a system 100 in accordance with an example embodiment. The system 100 includes a predictive model 102, a resource manager 104, one or more node managers 106A, 106B, and 106C and an open time series database 108. The predictive model 102 acts to make predictions about anomalies occurring in cluster. A rules engine 110 provides rules that are written or otherwise created for monitoring various metrics on data from the database 108. The output of these rules may be used to determine anomalies, either in conjunction with or in lieu of the predictive model 102.

Predictive Model

Figure 2:
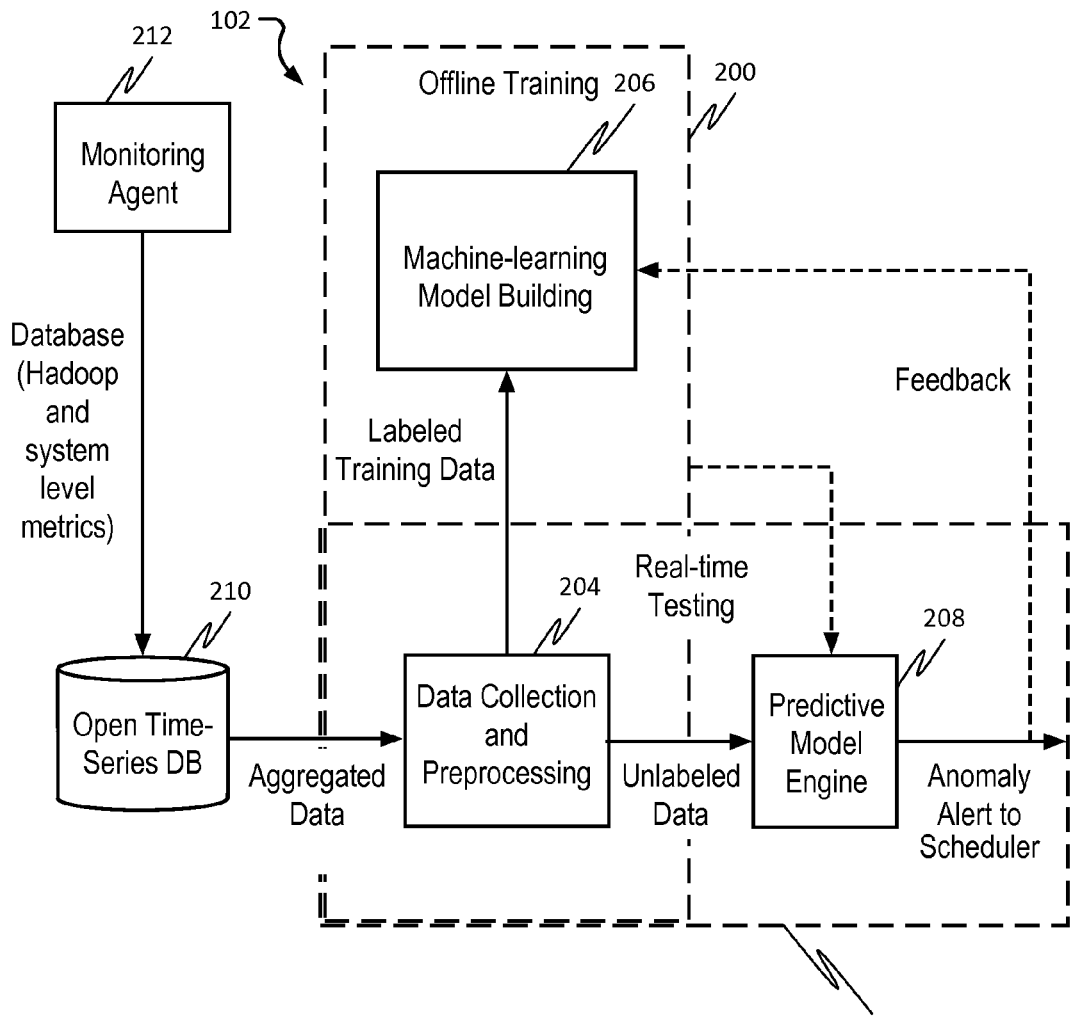
FIG. 2 is a diagram illustrating a predictive model in more detail in accordance with an example embodiment.

In an example embodiment, the predictive model 102 has an offline training phase and a real-time testing phase. FIG. 2 is a diagram illustrating a predictive model, such as the predictive model 102 of FIG. 1 in more detail. The offline training phase 200 and the real-time testing phase 202 are depicted as overlays on the predictive model 102. The training in general takes a set of training data and fits the data for model selection. The history of cluster incidents may be used as training data. The training data may be obtained from the data collection and preprocessing component 204, labeled, and sent to a machine-learning model building component 206. Once training of the model is done, the model may be fed to a predictive model engine 208 for real-time testing. Testing data may generally be collected at real-time. Both training and testing phases follow similar processing steps. Below in the following sub-sections, the steps and components of the predictive model framework are described in more detail Data Collection In an example embodiment, the predictive model uses time-series data from an open time series database 210 for specific system-level and Hadoop metrics, which are received from a monitoring agent 212. Each node in the cluster reports its data to the monitoring framework, which stores them in the open time series database 210. In one example embodiment, there are total of 163 metrics that can be chosen for analysis. These metrics are representatives for the types of anomalies that are typically addressed in, for example, an ecommerce system.

A data collection module collects data of metrics periodically, e.g., at every minute interval. There are two major types of nodes, enterprise nodes, and data nodes. For enterprise nodes, it could be zookeeper server, Hadoop name node server, etc. In this disclosure, the focus is only on how to find out problematic Hadoop data nodes, since it happens more frequently than other types of nodes, although embodiments are possible where the disclosure is modified to find out problematic data nodes in other types of systems.

From the history of Hadoop cluster incidents, a training dataset may be created for predictive model. The system can find out which node was failed at what time, and therefore label the training dataset as either abnormal or normal depending on whether the timestamp of collected dataset falls within or outside the time period of an incident. In one example embodiment, one-hour data can be selected before a problem is detected as abnormal training dataset, because it is believed that data patterns at that time period should reflect anomalous behavior. In this example embodiment, five-hour data can be selected after the node was restored as normal data.

Data may be retrieved in, for example JSON format from the open time series database 210 via sending a REST API call. The data collection module is flexible enough to collect data for each node, for all the nodes that belong to a rack, or for all nodes in the cluster.

Data Preprocessing

Generally machine-learning models may need data in tabular format. Each row denotes data point for a specific timestamp and each column indicates a feature or Hadoop metric. In an example embodiment of the monitoring agent 212, even if the data is collected for every minute, the system emits values of each metrics from a node at different point in time within a minute window. Therefore, the metrics values collected within a window of one minute can be consolidated into one data point. Then, the system may shift to the next one-minute time window, and create the next data point. After processing data in this way, the system may still notice that some metrics values in the data points are missing. It could be due to the data reporting issue of the monitoring system, or that there are really no data. Since the machine-learning algorithm does not allow empty data points, data can be copied from the latest available time window. The rationale behind doing a copy is that time-series data do not drastically change within short durations. For some metrics, data for the whole five-hour period of time are empty. In that case, those empty data may be filled out with a constant value, for example with zeros, so that it is ignored at a later time during training phase.

Standard deviation can be computed for each column (feature). If the standard deviation is less than a pre-defined threshold, generally a very small number, the column can be removed as input from the computation of the model. After these low-variance columns are removed, Principal Component Analysis (PCA) can be applied on it for feature reduction. In this case, some of the features for data points are highly correlated. For example, hadoop.app.cpuUser and hadoop.app.cpuNice are related with each other. By applying PCA, the system can find a linear combination of correlated features. PCA also chooses the best combination from a set of possible linear functions that retains maximum variance of the data. In one example embodiment, 163 features were reduced to around 50 features after PCA.

Multivariate Gaussian Distribution

Figure 3:
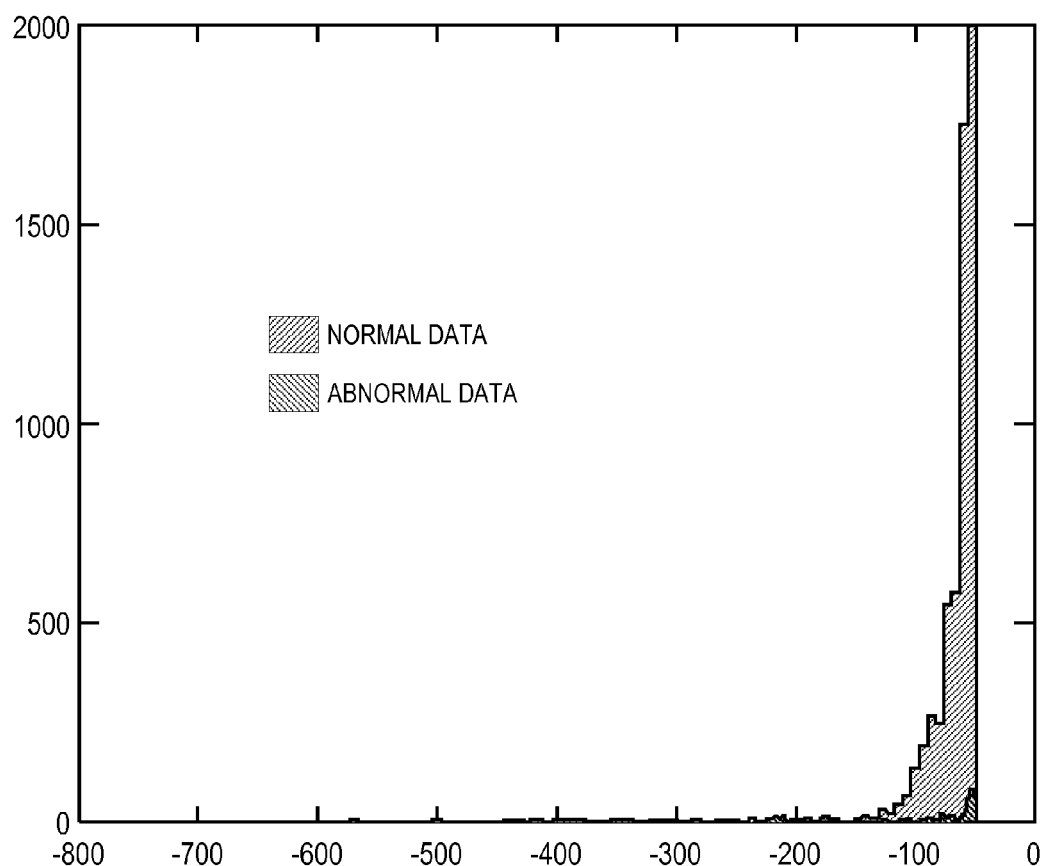
FIG. 3 is a histogram of logarithmic value of probability for normal data versus abnormal data in accordance with an example embodiment.
Figure 4:
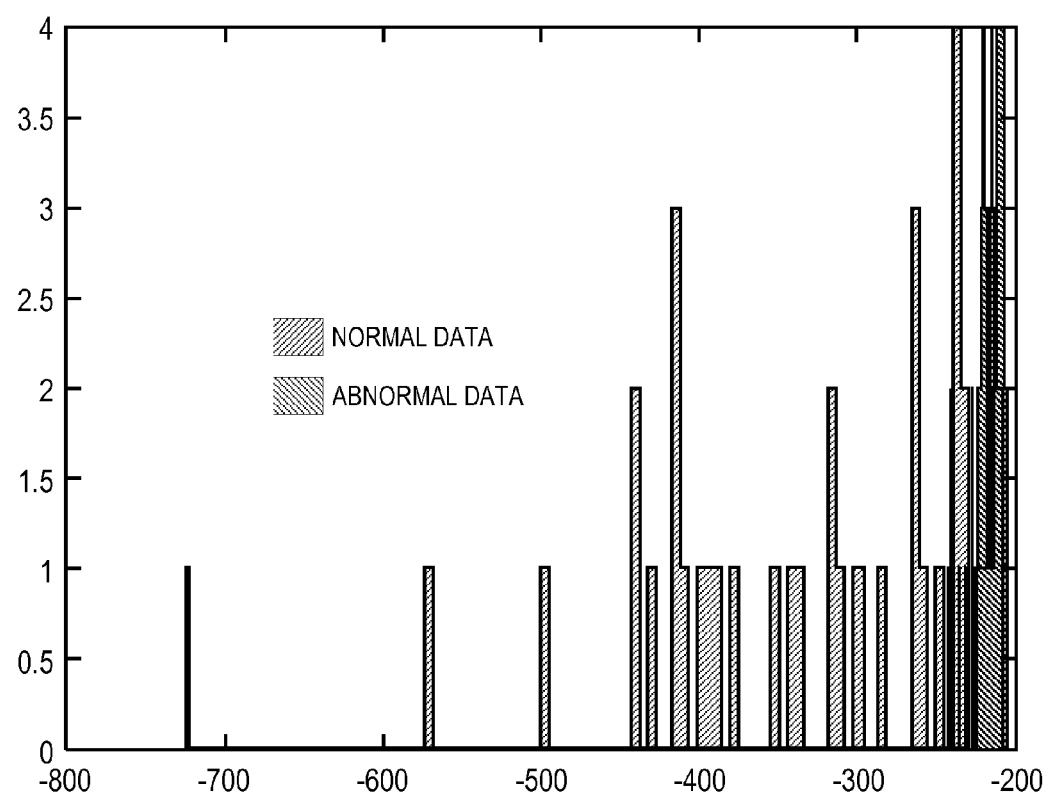
FIG. 4 is a zoom-in of a histogram chart for a region where logarithmic value of probability is less than −200 in accordance with an example embodiment.

After PCA is applied to compute reduced feature set, the training dataset may be used for building a model using Multivariate Gaussian Distribution. Mean and covariance of training data set can be used so that the system can compute probability using a multivariate Gaussian Function, such as the following.

$$f_x(x_1, \ldots, x_k) = \frac{1}{\sqrt{(2\Pi)^k |\Sigma|}} \exp\left(-\frac{1}{2}(x-\mu)^T \Sigma^{-1} (x-\mu)\right),$$

where $f_x$ is the probability value, $x_i$ is a data point, k is the number of features, $\Sigma$ is the covariance matrix, $|\Sigma|$ is the determinant of $\Sigma$, and $\mu$ is the mean of x. The output of the probability distribution denotes a probability value. Theoretically the probability value for anomalous data node should exhibit a very small number, while the normal data nodes should have higher values. The same pattern may be observed in this dataset. Anomalous data nodes have very small probability values, around 10^(−50) to 10^(−500). In order to easily visualize the distribution, logarithms on its value may be taken and histogram graphs may be plotted as shown in FIG. 3 and FIG. 4. FIG. 3 is a histogram of logarithmic value of probability for normal data versus abnormal data. FIG. 4 is a zoom-in of a histogram chart for a region where logarithmic value of probability is less than −200 in accordance with an example embodiment. As can be seen, the abnormal data usually congregate near −200 to −300.

Cut-off Threshold to Differentiate Normal and Abnormal

It is useful to find out which data nodes in the cluster fall within an abnormal region from the Gaussian Distribution Function, so that they can be marked as anomalous nodes. In an example embodiment the probability for a data point can be very small, even for a normal data node, and potentially be classified as abnormal, which may indicate false-positives. Thus, it may be helpful to find a threshold that can help reduce the false-positives even more and also maximize true anomalies or true-positives. Thus, for the evaluation function, the following may be used:

(a) Matthews Correlation Coefficient $$MCC = \frac{TP \cdot TN - FP \cdot FN}{\sqrt{(TP+FP)(TP+FN)(TN+FP)(TN+FN)}}$$

(b) Half total error rate $$AAcc = \frac{1}{2}\left(\frac{TP}{TP+FN} + \frac{TN}{TN+FP}\right),$$

where TP, TN, FN, FP denote true-positive, true-negative, false-negative, and false-positive respectively.

Anomaly Score Calculation

Since the probability of an anomaly may be a very small number, a function to calculate anomaly score of data nodes, which is between 0 and 10, may be defined. The higher score denotes a node is anomalous. Two thresholds may be picked: one is soft threshold and the other one is hard threshold. The thresholds can be determined from the training dataset.

Determining Features that Contributes to Anomaly

Once it is detected that a data node is anomalous, it may be helpful to find out the features that contribute to the anomaly. This information may be deduced from using single-variate Gaussian Distribution Function as follows $$p(x) = \prod_{j=1}^{n} p(x_j; \mu_j, \sigma_j^2) = \prod_{j=1}^{n} \frac{1}{\sqrt{2*\text{pi}}} \frac{1}{\sigma_j} \exp\left(-\frac{(x_j-\mu_j)^2}{2\sigma_j^2}\right),$$

where n denotes the number of features, and μj and σj determine mean and standard deviations for each feature j.

In single-variate Gaussian Distribution, a probability value can be computed for each of the features separately and then they can be factorized to determine the final probability. As the data node is anomalous, the factorized value should be very small and there must be features with significant smaller individual probabilities than others, and those contribute to low final probability. The final probabilities of these features would lie around the boundary of the distribution curve. These features with lower individual probabilities are selected and sorted in ascending order. Based on experimentation, the top 5 ranked features may be viewed as a good indication of root cause for the anomaly, and these may be called "influencers".

In another example embodiment, a different mechanism for influencers is provided. After the probability values are sorted in ascending order, those features whose contributions (e.g., scores) are about or above 50% of the top feature's contribution are selected.

Once the anomaly score is calculated and the list of influencers is obtained as described above, this information can be passed to the resource manager 104. Referring back to FIG. 1, the resource manager 104 may include a scheduler 110 and a YARN scheduler 112.

Scheduler

The goal of scheduler 110 is to deliver service-level agreements (SLAs) for complex production jobs, reduce latencies due to system failures, and maximize cluster utilization.

Architecture

Before the scheduler 110 is explained, it may be helpful to give a brief overview of the architecture of YARN. The YARN execution framework comprises four major components, which are as follows: 1) Resource Manager (RM) 2) YARN Scheduler 3) Application Master (AM) and 4) Node Managers (NM).

The RM runs as a daemon on a dedicated machine in the cluster, and acts as the central authority arbitrating resources among various competing applications in the cluster. Given the global view of the cluster resources, RM allocates cluster resources as "containers" to the applications depending on the application demand, scheduling priorities, and resource availability.

The YARN Scheduler 112 runs in the context of RM. The main responsibility of the YARN scheduler 112 is to make scheduling decisions based on available resources information received from RM. The YARN Scheduler 112 contains multiple queues and each queue has a fraction of the total capacity of the cluster. These queues are elastic in nature and can grow and shrink based on application needs. Scheduler allocates workloads to appropriate nodes based on data locality, resource availability, and type of hardware.

The AM manages lifecycle aspects of an application including, but not limited to, dynamically increasing and decreasing resources consumption, managing the flow of execution (e.g., running reducers against the output of maps), handling faults and computation skew, and performing other local optimizations.

The NM is the "worker" daemon in YARN. It authenticates container leases, manages containers, and monitors their execution. NM can be configured to report memory, CPU, and other available resources for a node. After registering with the RM, NM sends heartbeats with its status and receives instructions for launching or killing the containers in the node.

Figure 5:
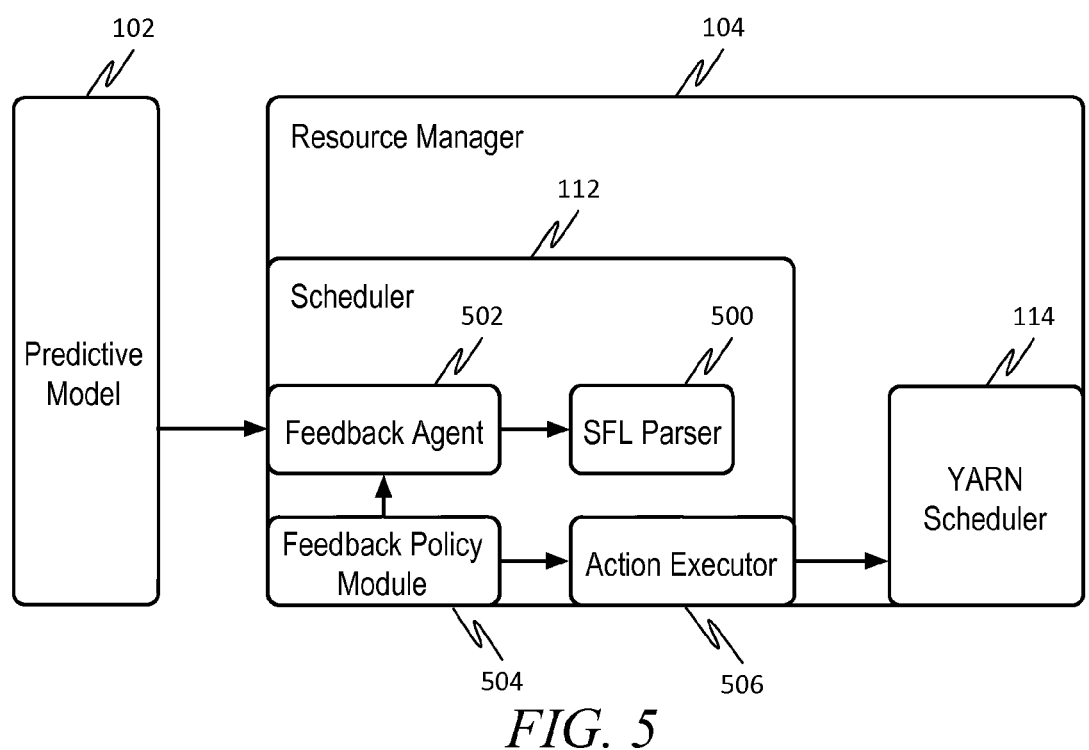
FIG. 5 is a block diagram illustrating a resource manager in more detail, in accordance with an example embodiment.

The core of the scheduler 110 extends the above-mentioned four components of YARN Scheduler 112, and comprises four different components. FIG. 5 is a block diagram illustrating a resource manager, such as resource manager 104, in more detail, in accordance with an example embodiment. As can be seen, the scheduler 110 includes a scheduler feedback language (SFL) parser 500, a feedback agent 502, a feedback policy module 504, and an action executor 506.

Scheduler Feedback Language (SFL)

In an example embodiment time-series data is modeled from cluster nodes, and thus it is beneficial for the scheduler 110 to accept anomaly scores in a time-series fashion. Therefore, Scheduler Feedback Language (SFL) may be used.

In an example embodiment, SFL consists of four dimensions a: 1) node identifier, 2) time dimension, 3) anomaly score for the node in concern, and 4) influencers.

An SFL expression could be the following:

An atomic expression of the form [{T1, N1, S1, F1 [f1:s1, f2:s2, . . . ]}, {T1, N2, S2, F2 [f1:s1, f2:s2, . . . ]}, . . . ], where T1 is timestamp when a score is generated, N1 and N2 correspond to the nodes for which the anomaly scores are computed, S1 and S2 are aggregated scores for the nodes N1 and N2 respectively, and F1, F2 are the influencers. Expressions defined within F1 and F2 are a list of individual influencers and their scores.

Multiple time expressions can also be defined in a request in the form [[{T1, N1, S1, F1 [f1:s1, f2:s2, . . . ]}, {T1, N2, S2, F2 [f1:s1, f2:s2, . . . ]}, . . . ], [{T2, N1, S1, F1 [f1:s1, f2:s2, . . . ]}, {T2, N2, S2, F2 [f1:s1, f2:s2, . . . ]}, . . . ]]. The scheduler 110 is capable of taking requests in this form and performing actions.

Figure 6:
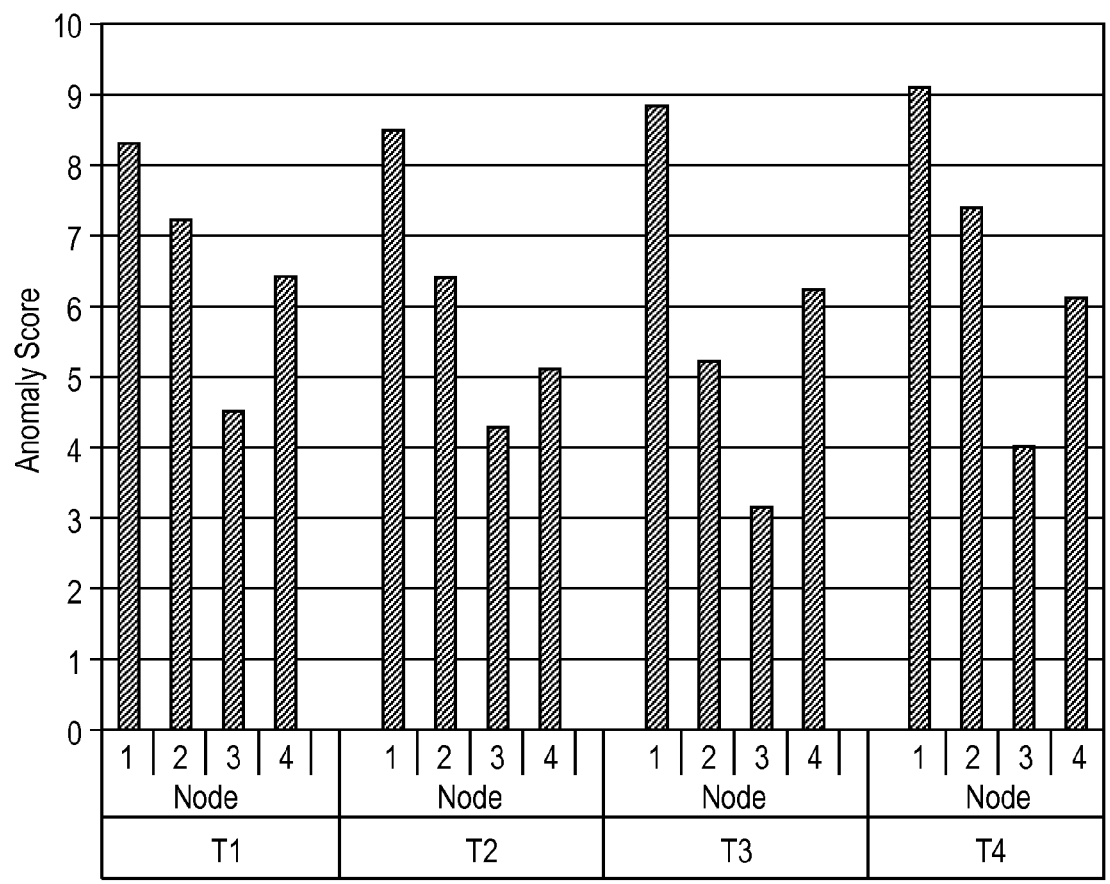
FIG. 6 shows the overall anomaly scores in Scheduler Feedback Language (SFL) in accordance with an example embodiment.
Figure 7:
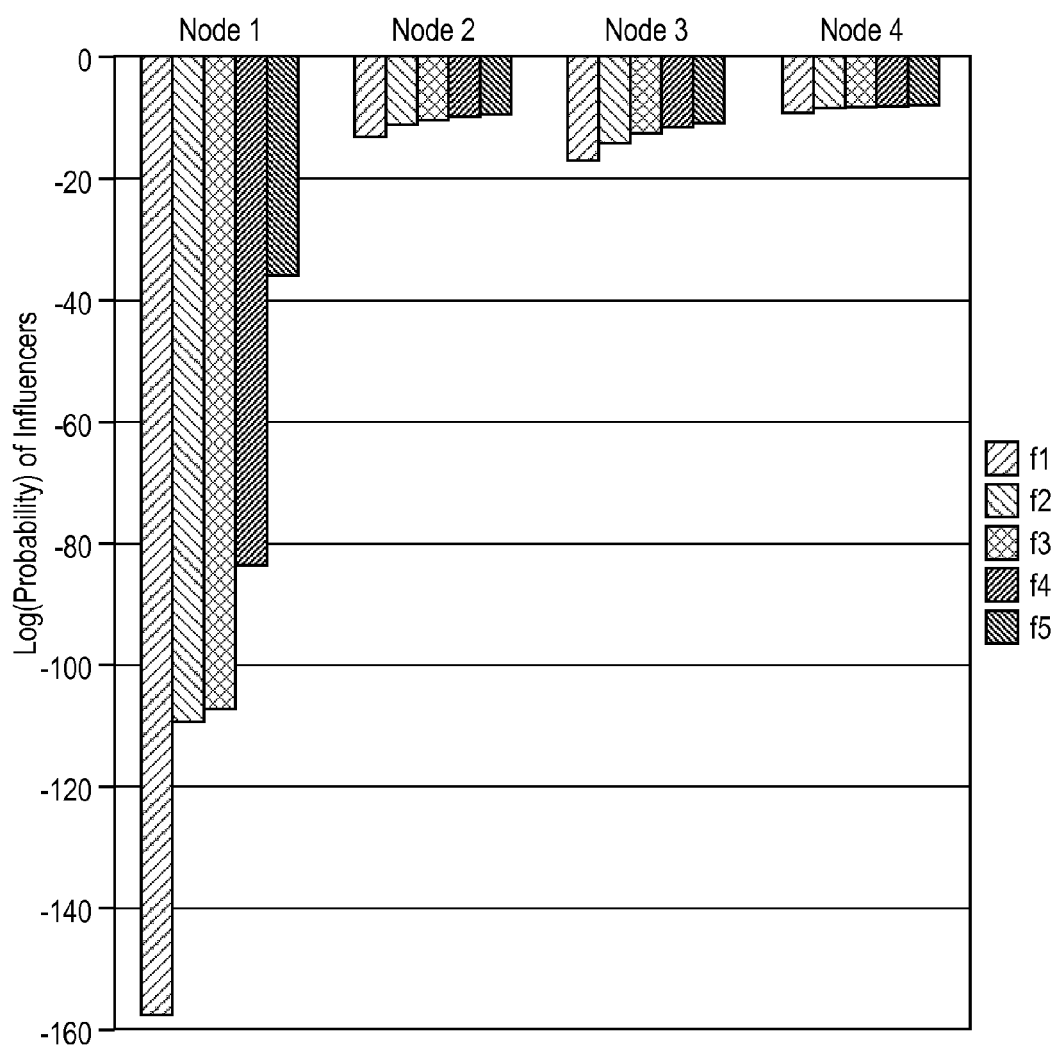
FIG. 7 denotes top five influencers for a type of cluster problem and their individual scores in accordance with an example embodiment.

FIGS. 6 and 7 show graphical representations of an instance defined using SFL. FIG. 6 shows the overall anomaly scores in SFL, and FIG. 7 denotes top five influencers for a type of cluster problem and their individual scores. Top five influencers change with different types of problems at hand. For example, hadoop.datanode.MemHeapUsedM.STATE.60s is a very common influencer for memory related issues in the cluster. Likewise, hadoop.app.cpu_load_avg_15min.STATE.60s is the most common influencer for issues related to compute load on the cluster nodes.

In one example embodiment, JSON can be used for SFL.

Feedback Agent

As shown in FIG. 5, in an example embodiment the feedback agent 502 interacts with the predictive model 102 using pull-based REST APIs. The predictive model 102 can also push files to the feedback agent 502. By default, the predictive model 102 may push data in SFL to feedback agent whenever it has a result ready. The user can configure the agent to pull data from the model using REST.

Feedback Policy Module

In an example embodiment, the scheduler 110 takes scheduling rules as feedback policies from the system administrators. A feedback policy module 504 takes these policies and generates an execution plan.

In an example embodiment, a threshold-base correlation policy can be used. The policy takes into account the hard and soft thresholds generated by the predictive model. A threshold-based correlation policy may comprise the following rules:

If an anomaly score is received for a particular node below a soft threshold, which means the node is functional, then no actions are taken on that node.

If an anomaly score is received above the hard threshold for a node, which means the node is anomalous, then the node is removed from the cluster. In this case, the feedback policy module will generate a plan for removing the node from the cluster and provides this plan to action executor, which is described later.

If an anomaly score is received for a node, which is between the hard and soft threshold, that node is put in a watch list. The feedback policy module generates an execution plan of not scheduling anything further on that node. However, current workloads running on this node are not moved. Rather, the system waits for the next three iterations of the SFL to be generated for that node and compares the previous anomaly scores with the current one. If the current score is less than the soft threshold, the node is removed from the watch list and the system starts scheduling workload on that node. However, if the score increases monotonically in the last three iterations, the system looks into the influencers contributing to the anomaly for that node. The influencers may be compared with health reports generated by node managers of the faulty nodes. Depending on the type of influencers, an execution plan can be created to overcome the effects. For example, if influencers are CPU-related metrics, then the system may refrain from assigning the nodes further workload allocations. Similarly, if influencers are IO-related, the system may create an appropriate execution plan that solves the IO problems in the nodes.

Action Executor

The action executor 506 is the component that is responsible for execution of the plan generated by the feedback policy module 504. The action executor 506 may translate execution plans to events, already defined by the YARN architecture, and send these events to the resource manager 104 and scheduler 110. The events already defined in YARN are typically not sufficient to translate all the executions plans effectively. Therefore, a YARN event-model can be extended with the feedback events.

By using an extension to YARN scheduler with new policies and execution plans, the system can ensure that SLAs for critical workloads are met at most of the times. This results in high throughput of the cluster. As the system supports soft and hard thresholds, the scheduler 110 can make decisions to avoid allocation of SLA critical workloads to nodes or remove workloads from them, which lie between the soft and hard thresholds.

Performance Results

The described system is designed with real-world needs and deployments in mind, so instead of focusing on improving system performance in one area of performance criteria, it may be helpful to push for a balanced improvement across multiple important areas. A prototype implementation of an example embodiment was implemented in a test cluster with 260 nodes. Hadoop YARN (version 2.4.0) was installed. Each node had 4 Intel® Xeon® L5520 CPU@2.27 GHz (16 cores), with network speed of 1 Gb/sec, local hard disk of 6×1 TB running at 7200 RPM, and Ext 3 file system. MapReduce workloads or applications were run in the cluster for experiments. Each application had multiple mapper and reducer tasks. In the tests, an application with 1 TB of data was run and results shown for the reducer tasks.

In these experiments, three scenarios are considered to compare performance: 1) Cluster runs Hadoop and no monitoring system is installed, also known as Traditional Hadoop in further discussions, 2) Cluster runs Hadoop and there are monitoring systems installed, 3) Cluster runs Hadoop with the above-described extension.

Figure 8:
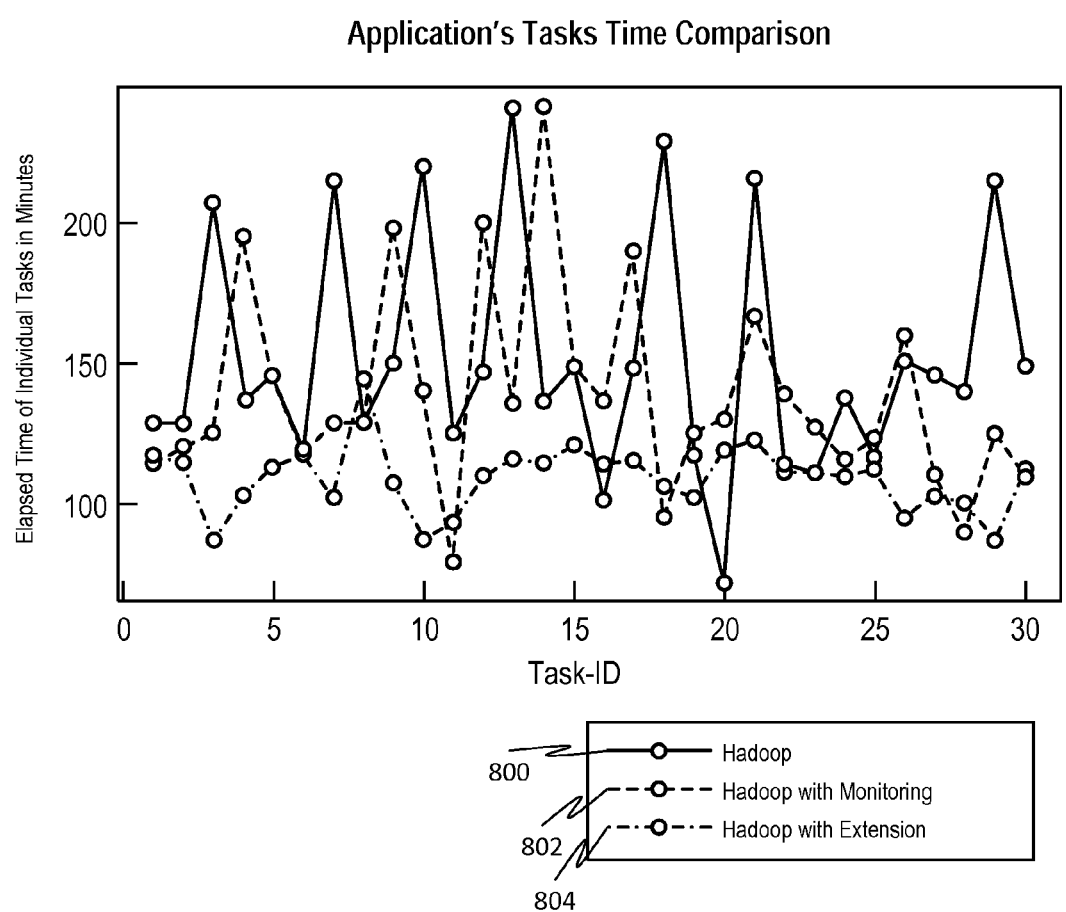
FIG. 8 shows the execution time taken by 30 reducer tasks running in parallel in accordance with an example embodiment.

In FIG. 8, the execution time taken by 30 reducer tasks running in parallel is shown. Failures in 4 random nodes in the system were injected while running the tests. The plot 800 in the figure describes run time of reducers when the cluster runs Hadoop and no monitoring system were installed. Plots 802 and 804 describe execution time when cluster runs Hadoop with a monitoring system in place and with the new extensions respectively. As can be seen, tasks execute faster in an event of anomaly when the extensions are installed and the improvement in execution time is 28.10% on an average compared to traditional Hadoop installation, and 21.46% on an average compared to Hadoop with a monitoring system in place. This is due to the fact that the above-described system detects node failures in advance and do not schedule tasks to faulty nodes, thus improving total execution time of the reducer tasks. Whereas, in other two cases, the tasks get scheduled on the faulty nodes and therefore they fail.

Figure 9:
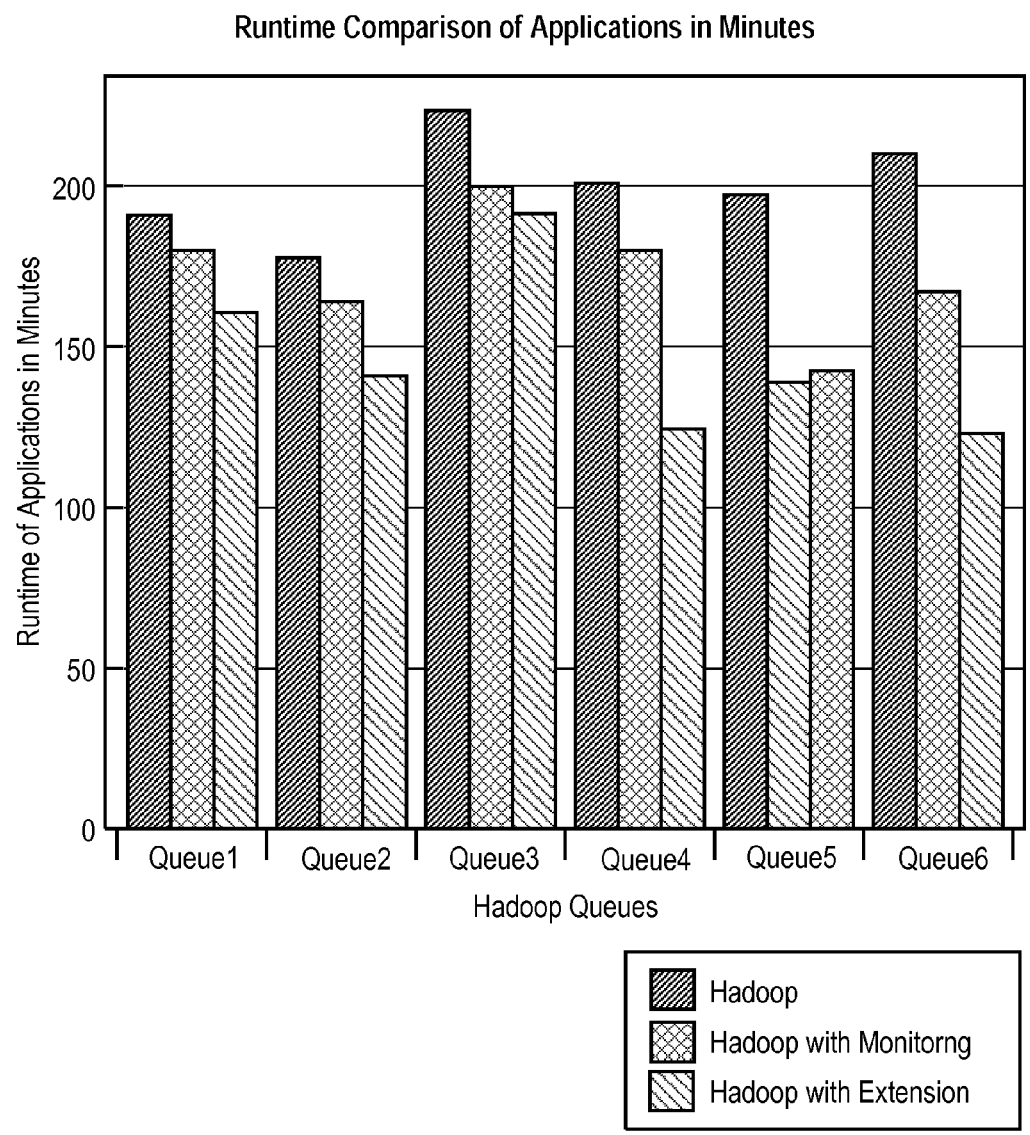
FIG. 9 depicts details of YARN queue-level application execution times in accordance with an example embodiment.

FIG. 9 depicts details of YARN queue-level application execution times. A single application was run with 6 different queues running in parallel. Each queue was configured with different capacities. The execution time of the application was compared with three scenarios mentioned above. It was found that an example embodiment improves queue-level application run time by on an average 26.68% against traditional Hadoop installation, and 14.66% against Hadoop when monitoring system is in place.

Figure 10:
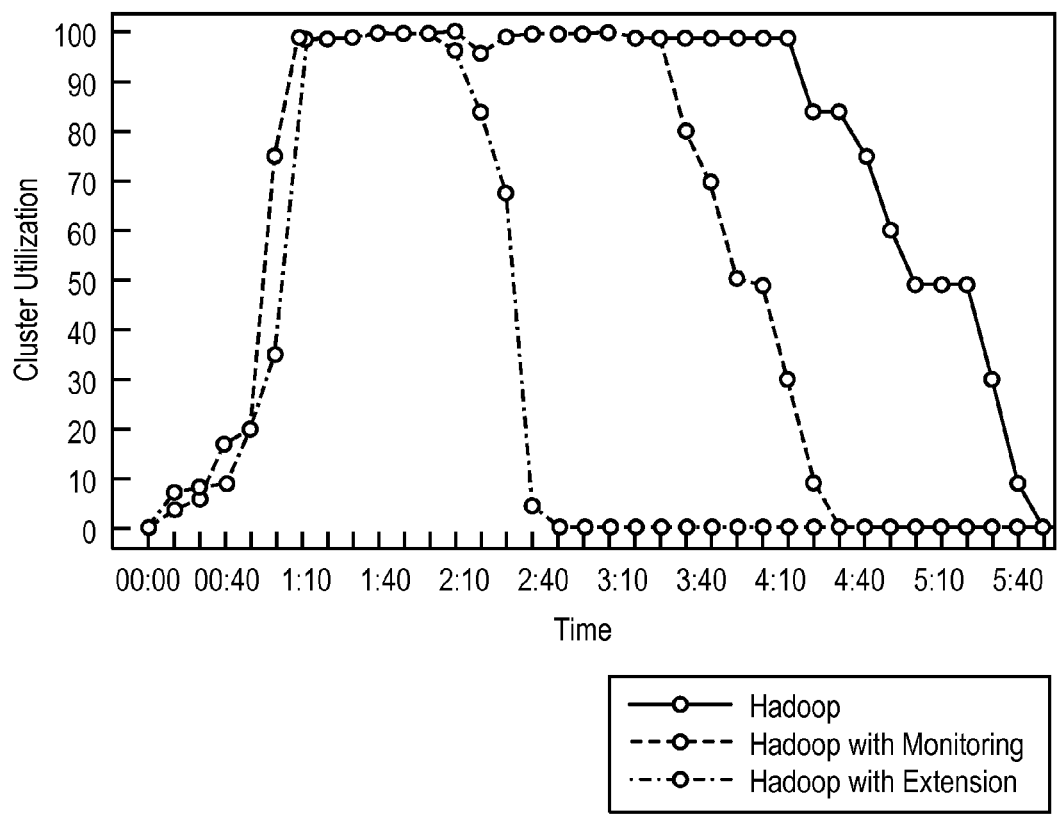
FIG. 10 depicts a comparison of cluster utilization in an event of anomaly in accordance with an example embodiment.

Cluster utilization is compared in FIG. 10 in an event of anomaly for three scenarios mentioned above. It can be seen that the cluster reaches its full capacity within 40 minutes of starting time of applications. When applications are scheduled using an example embodiment in the cluster, applications complete faster than other two scenarios. For example, in this figure it can be seen that applications finish within 2:30 hrs. from their start time when the scheduling is done using the example embodiment. Area under the curve for compute resource utilization is smallest for the example embodiment compared to both traditional Hadoop, and Hadoop with monitoring system in place. Since the area under the curve is small, it reduces queue wait time. When failures are injected in the system, the example embodiment schedules more workloads using the same number of cluster resources compared to the other scenarios. Traditional Hadoop and Hadoop with monitoring system in place takes a longer time to complete an application in an event of anomaly, therefore wasting computing resources. By using the above-described example embodiment, the cluster is utilized more effectively during anomaly, saving compute resources on an average by 64.23% and 51.15% compared to running traditional Hadoop and Hadoop with monitoring system respectively.

To measure the accuracy of the predictive model 104, the predictive model 104 was tested against the incidents reported in a real production cluster. The production cluster contained 480 nodes. The dataset was randomly shuffled and 300 nodes were picked for testing. Table I shows the experimental results. Each row in the table represents one test run. From total of 163 features, low-variance features were removed, and the number of features was reported in the first column of the table. Then PCA was applied and educed dimensions/features were obtained. They are shown in column 2 of the table. At each run, MCC was used to compute the threshold, which is shown in the column 3 of the table. The threshold is the boundary between normal vs. anomalous datapoints. It can be seen that false positives are low, around 2%. Since in this system scheduler makes real-time decisions of scheduling based on the anomaly scores from the predictive model, false positives are considered to be the most important metric for performance evaluation of the predictive system.

TABLE I

MODEL EXPERIMENTAL RESULTS

| Low variance Removed | Dimension reduced | Threshold | False positives (%) |
|---|---|---|---|
| 93 | 49 | −133.741 | 3.12 |
| 95 | 50 | −189.315 | 1.48 |
| 96 | 51 | −356.972 | 0.15 |
| 96 | 52 | −200.938 | 1.53 |
| 96 | 52 | −169.076 | 3.29 |
| 95 | 51 | −275.861 | 0.57 |

The predictive model component of the above-described system can be included in an e-commerce system to monitor anomalies in the server clusters used to implement such an e-commerce system.

Figure 11:
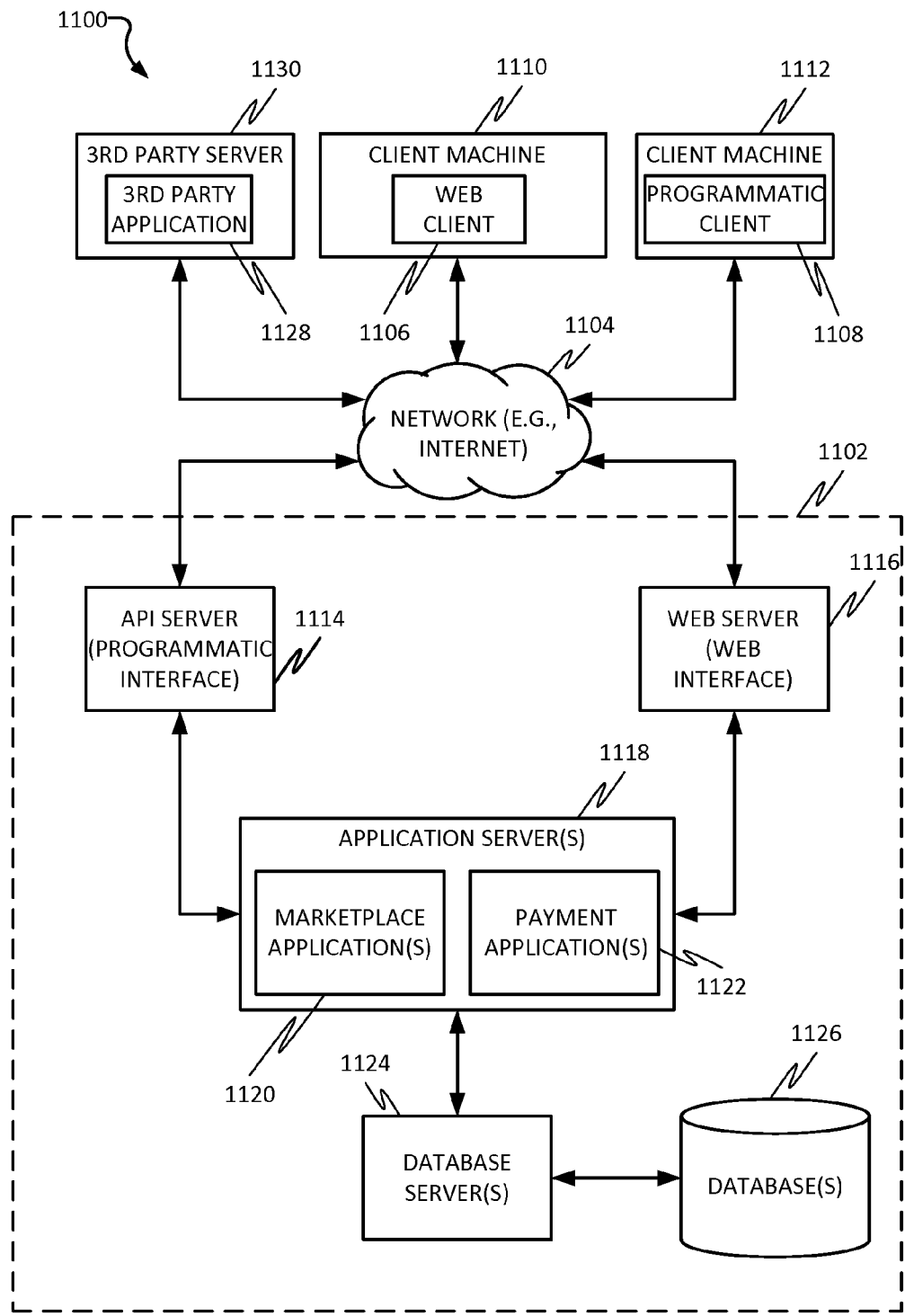
FIG. 11 is a network diagram depicting a client-server system, within which one example embodiment may be deployed.

FIG. 11 is a network diagram depicting a client-server system 1100, within which one example embodiment may be deployed. A networked system 1102, in the example form of a network-based marketplace or publication system, provides server-side functionality, via a network 1104 (e.g., the Internet or a Wide Area Network (WAN)), to one or more clients. FIG. 11 illustrates, for example, a web client 1106 (e.g., a browser, such as the Internet Explorer® browser developed by Microsoft® Corporation of Redmond, Wash. State) and a programmatic client 1108 executing on respective client machines 1110 and 1112.

An Application Program Interface (API) server 1114 and a web server 1116 are coupled to, and provide programmatic and web interfaces respectively to, one or more application servers 1118. The application servers 1118 host one or more marketplace applications 1120 and payment applications 1122. The application servers 1118 are, in turn, shown to be coupled to one or more database servers 1124 that facilitate access to one or more databases 1126.

The marketplace applications 1120 may provide a number of marketplace functions and services to users who access the networked system 1102. The payment applications 1122 may likewise provide a number of payment services and functions to users. The payment applications 1122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 1120. While the marketplace and payment applications 1120 and 1122 are shown in FIG. 11 to both form part of the networked system 1102, it will be appreciated that, in alternative embodiments, the payment applications 1122 may form part of a payment service that is separate and distinct from the networked system 1102.

Further, while the system 1100 shown in FIG. 11 employs a client-server architecture, the embodiments are, of course, not limited to such an architecture, and could equally well find application in a distributed, or peer-to-peer, architecture system, for example. The various marketplace and payment applications 1120 and 1122 could also be implemented as standalone software programs, which do not necessarily have networking capabilities.

The web client 1106 accesses the various marketplace and payment applications 1120 and 1122 via the web interface supported by the web server 1116. Similarly, the programmatic client 1108 accesses the various services and functions provided by the marketplace and payment applications 1120 and 1122 via the programmatic interface provided by the API server 1114. The programmatic client 1108 may, for example, be a seller application (e.g., the Turbo Lister application developed by eBay Inc., of San Jose, Calif.) to enable sellers to author and manage listings on the networked system 1102 in an offline manner, and to perform batch-mode communications between the programmatic client 1108 and the networked system 1102.

FIG. 11 also illustrates a third-party application 1128, executing on a third-party server 1130, as having programmatic access to the networked system 1102 via the programmatic interface provided by the API server 1114. For example, the third-party application 1128 may, utilizing information retrieved from the networked system 1102, support one or more features or functions on a website hosted by a third party. The third-party website may, for example, provide one or more promotional, marketplace, or payment functions that are supported by the relevant applications of the networked system 1102.

Figure 12:
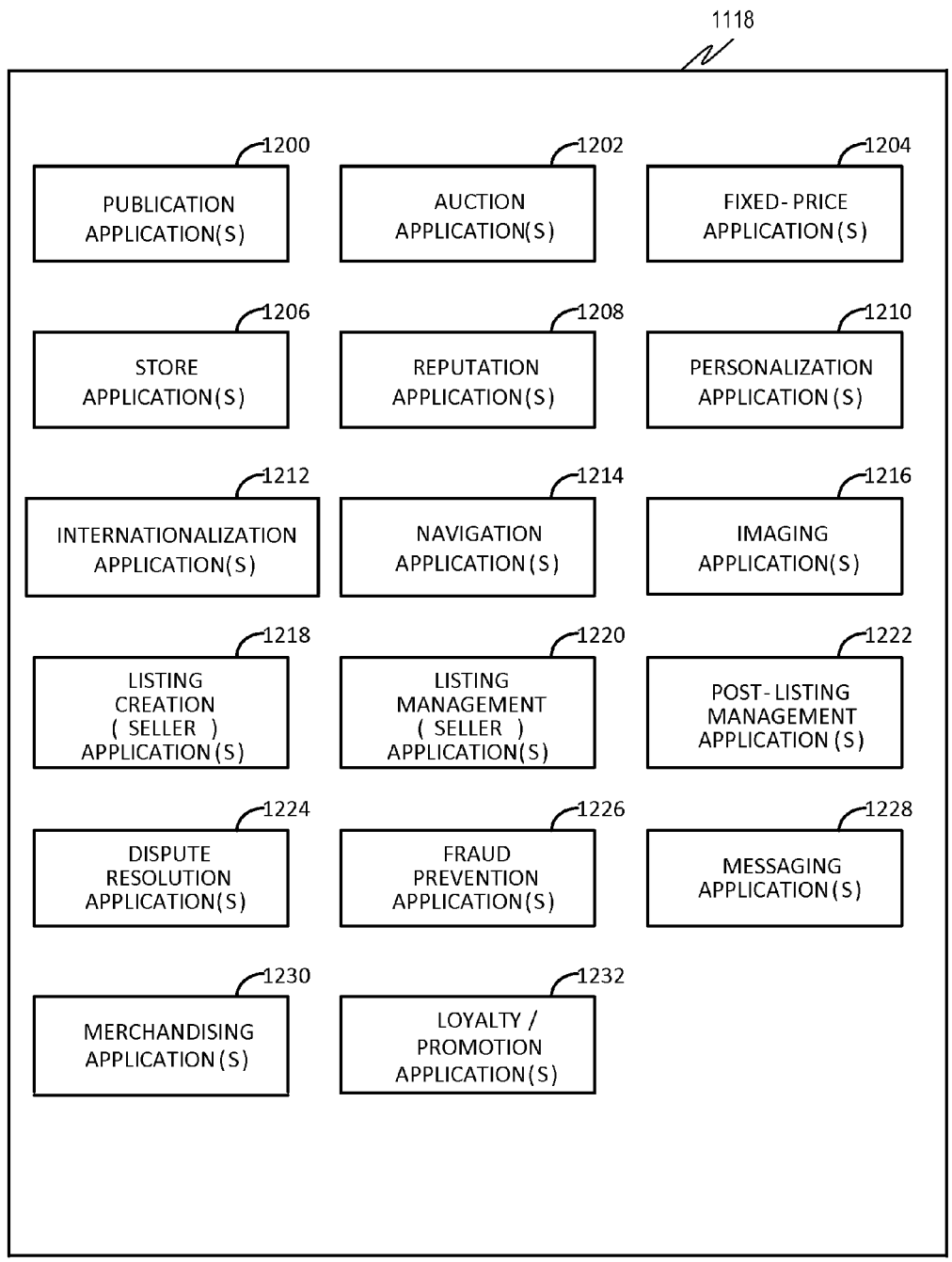
FIG. 12 is a block diagram illustrating marketplace and payment applications and that, in one example embodiment, are provided as part of application server(s) in the networked system.

FIG. 12 is a block diagram illustrating marketplace and payment applications 1120 and 1122 that, in one example embodiment, are provided as part of application server(s) 1118 in the networked system 1102. The applications 1120 and 1122 may be hosted on dedicated or shared server machines (not shown) that are communicatively coupled to enable communications between server machines. The applications 1120 and 1122 themselves are communicatively coupled (e.g., via appropriate interfaces) to each other and to various data sources, so as to allow information to be passed between the applications 1120 and 1122 or so as to allow the applications 1120 and 1122 to share and access common data. The applications 1120 and 1122 may furthermore access one or more databases 1126 via the database servers 1124.

The networked system 1102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 1120 and 1122 are shown to include at least one publication application 1200 and one or more auction applications 1202, which support auction-format listing and price setting mechanisms (e.g., English, Dutch, Vickrey, Chinese, Double, Reverse auctions, etc.). The various auction applications 1202 may also provide a number of features in support of such auction-format listings, such as a reserve price feature whereby a seller may specify a reserve price in connection with a listing, and a proxy-bidding feature whereby a bidder may invoke automated proxy bidding.

A number of fixed-price applications 1204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 1206 allow a seller to group listings within a "virtual" store, which may be branded and otherwise personalized by and for the seller. Such a virtual store may also offer promotions, incentives, and features that are specific and personalized to a relevant seller.

Reputation applications 1208 allow users who transact, utilizing the networked system 1102, to establish, build, and maintain reputations, which may be made available and published to potential trading partners. Consider that where, for example, the networked system 1102 supports person-to-person trading, users may otherwise have no history or other reference information whereby the trustworthiness and credibility of potential trading partners may be assessed. The reputation applications 1208 allow a user (for example, through feedback provided by other transaction partners) to establish a reputation within the networked system 1102 over time. Other potential trading partners may then reference such a reputation for the purposes of assessing credibility and trustworthiness.

Personalization applications 1210 allow users of the networked system 1102 to personalize various aspects of their interactions with the networked system 1102. For example, a user may, utilizing an appropriate personalization application 1210, create a personalized reference page at which information regarding transactions to which the user is (or has been) a party may be viewed. Further, a personalization application 1210 may enable a user to personalize listings and other aspects of their interactions with the networked system 1102 and other parties.

The networked system 1102 may support a number of marketplaces that are customized, for example, for specific geographic regions. A version of the networked system 1102 may be customized for the United Kingdom, whereas another version of the networked system 1102 may be customized for the United States. Each of these versions may operate as an independent marketplace or may be customized (or internationalized) presentations of a common underlying marketplace. The networked system 1102 may accordingly include a number of internationalization applications 1212 that customize information (and/or the presentation of information by the networked system 1102) according to predetermined criteria (e.g., geographic, demographic or marketplace criteria). For example, the internationalization applications 1212 may be used to support the customization of information for a number of regional websites that are operated by the networked system 1102 and that are accessible via respective web servers 1116.

Navigation of the networked system 1102 may be facilitated by one or more navigation applications 1214. For example, a search application (as an example of a navigation application 1214) may enable key word searches of listings published via the networked system 1102. A browse application may allow users to browse various category, catalogue, or inventory data structures according to which listings may be classified within the networked system 1102. Various other navigation applications 1214 may be provided to supplement the search and browse applications.

In order to make listings available via the networked system 1102 as visually informing and attractive as possible, the applications 1120 and 1122 may include one or more imaging applications 1216, which users may utilize to upload images for inclusion within listings. An imaging application 1216 also operates to incorporate images within viewed listings. The imaging applications 1216 may also support one or more promotional features, such as image galleries that are presented to potential buyers. For example, sellers may pay an additional fee to have an image included within a gallery of images for promoted items.

Listing creation applications 1218 allow sellers to conveniently author listings pertaining to goods or services that they wish to transact via the networked system 1102, and listing management applications 1220 allow sellers to manage such listings. Specifically, where a particular seller has authored and/or published a large number of listings, the management of such listings may present a challenge. The listing management applications 1220 provide a number of features (e.g., auto-relisting, inventory level monitors, etc.) to assist the seller in managing such listings. One or more post-listing management applications 1222 also assist sellers with a number of activities that typically occur post-listing. For example, upon completion of an auction facilitated by one or more auction applications 1202, a seller may wish to leave feedback regarding a particular buyer. To this end, a post-listing management application 1222 may provide an interface to one or more reputation applications 1208, so as to allow the seller conveniently to provide feedback regarding multiple buyers to the reputation applications 1208.

Dispute resolution applications 1224 provide mechanisms whereby disputes arising between transacting parties may be resolved. For example, the dispute resolution applications 1224 may provide guided procedures whereby the parties are guided through a number of steps in an attempt to settle a dispute. In the event that the dispute cannot be settled via the guided procedures, the dispute may be escalated to a third-party mediator or arbitrator.

A number of fraud prevention applications 1226 implement fraud detection and prevention mechanisms to reduce the occurrence of fraud within the networked system 1102.

Messaging applications 1228 are responsible for the generation and delivery of messages to users of the networked system 1102 (such as, for example, messages advising users regarding the status of listings at the networked system 1102 (e.g., providing "outbid" notices to bidders during an auction process or providing promotional and merchandising information to users)). Respective messaging applications 1228 may utilize any one of a number of message delivery networks and platforms to deliver messages to users. For example, messaging applications 1228 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks 1104.

Merchandising applications 1230 support various merchandising functions that are made available to sellers to enable sellers to increase sales via the networked system 1102. The merchandising applications 1230 also operate the various merchandising features that may be invoked by sellers, and may monitor and track the success of merchandising strategies employed by sellers.

The networked system 1102 itself, or one or more parties that transact via the networked system 1102, may operate loyalty programs that are supported by one or more loyalty/promotion applications 1232. For example, a buyer may earn loyalty or promotion points for each transaction established and/or concluded with a particular seller, and be offered a reward for which accumulated loyalty points can be redeemed.

Figure 13:
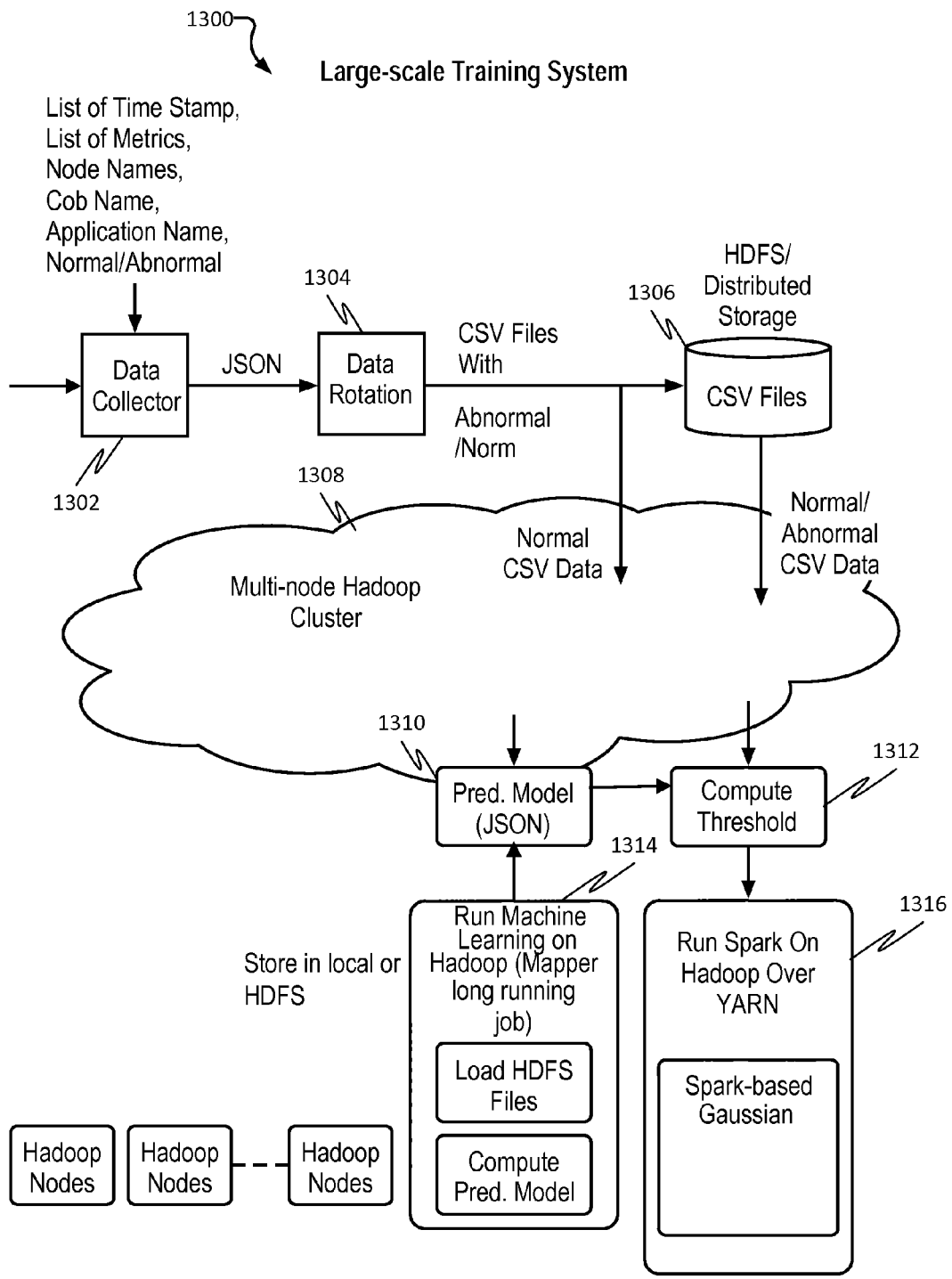
FIG. 13 is a block diagram illustrating a large-scale training system in accordance with an example embodiment.

FIG. 13 is a block diagram illustrating a large-scale training system 1300 in accordance with an example embodiment. The large-scale training system 1300 includes a data collector 1302, which collects various pieces of information about data, including, for example, a list of timestamps, a list of metrics, node names, colocation names, application names, and whether the data is normal or abnormal. The data collector 1302 may output this data in JavaScript Object Notation (JSON), for example. A data rotation component 1304 may then rotate the JSON data with comma-separated values (CSV) in a Hadoop Distributed File System (HDFS) storage 1306. Thus, the multi-node hadoop cluster 1308 may contain normal CSV data and normal/abnormal CSV data. A predictive model 1310 may then operate on the data in the multi-node Hadoop cluster 1308 and compute a threshold 1312 to determine if data is normal or abnormal. In an example embodiment, the predictive model may be saved in JSON format in a text file in one server or the HDFS.

The predictive model 1310 may be formed by a machine learning component 1314 that loads, for example HDFS files and computes a predictive model 1310 based on it.

In an example embodiment, Spark 1316 may be run on Hadoop over YARN in order to compute a multi-variable Gaussian probability.

Figure 14:
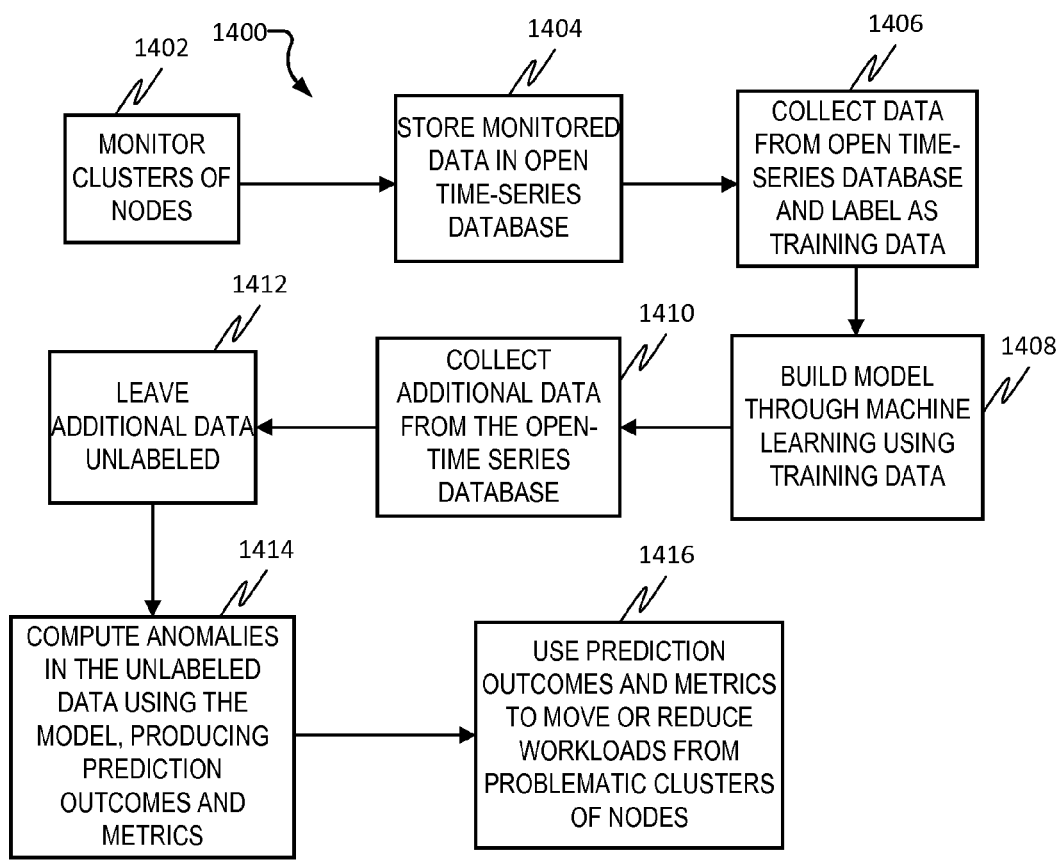
FIG. 14 is a flow diagram illustrating a method of performing anomaly detection in accordance with an example embodiment.

FIG. 14 is a flow diagram illustrating a method 1400 of performing anomaly detection in accordance with an example embodiment. At operation 1402, clusters of nodes in a network are monitored. At operation 1404, monitored data is stored in an open time-series database. At operation 1406, data is collected from the open time-series database and labeled as training data. At operation 1408, a model is built through machine learning using the training data.

At operation 1410, additional data is collected from the open time-series database. Then, at operation 1412 the additional data is left as unlabeled. At operation 1414, anomalies in the unlabeled data are computed using the model, producing prediction outcomes and metrics. This computing of anomalies may include building a model using a trading data set using Multivariate Gaussian Distribution, applying a Matthews Correlation coefficient as a threshold to reduce false positives, applying a half total error rate as a threshold to reduce false positives, and/or defining a function to calculate an anomaly score of data nodes.

Finally, at operation 1414, the prediction outcomes and metrics are used to move or reduce workloads from problematic clusters of nodes in the network. This may include detecting that a data node is anomalous and, in response to the detection that the data node is anomalous, locating one or more features contributing to the anomaly. The locating may include deducing one or more features contributing to the anomaly using a single-variate Gaussian Distribution Function.

Example Mobile Device

Figure 15:
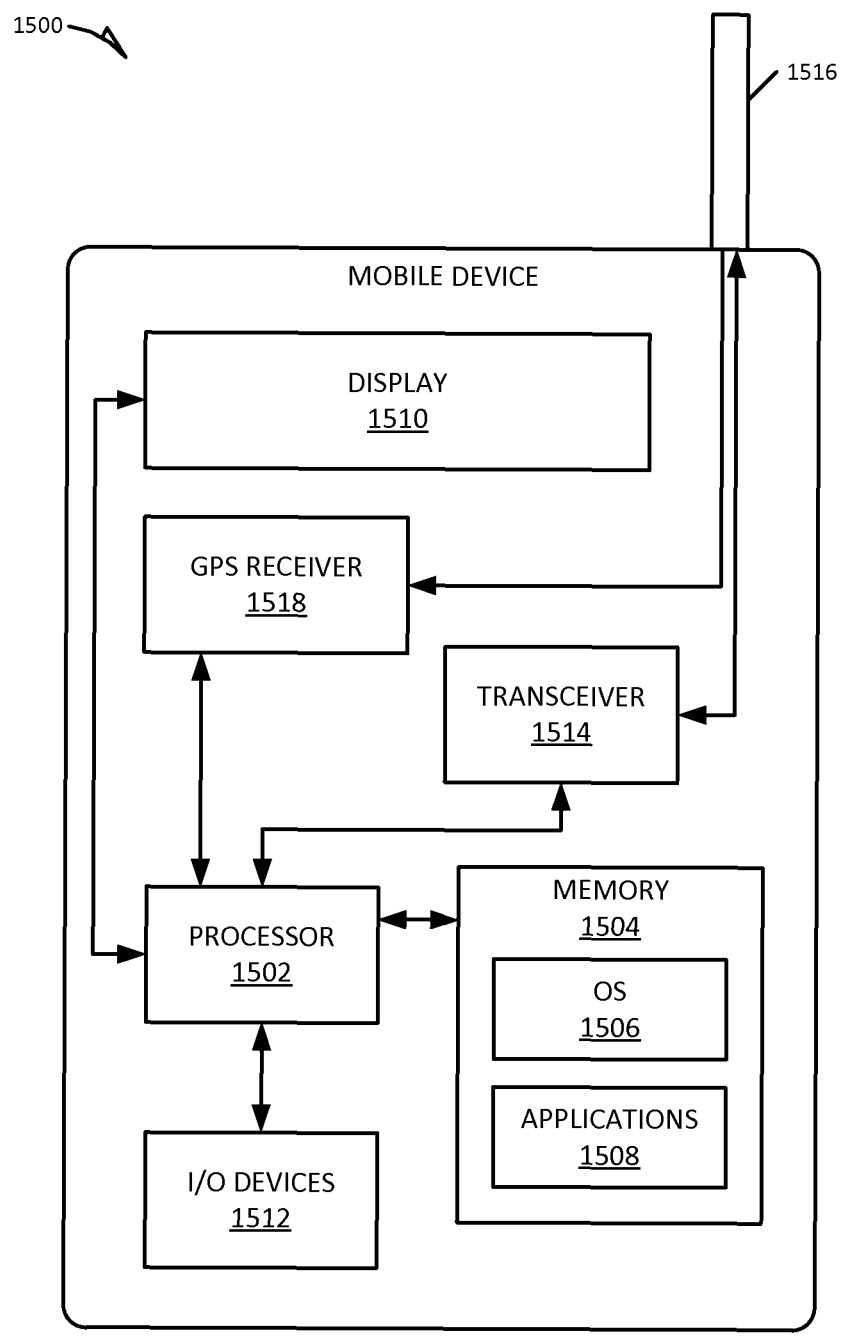
FIG. 15 is a block diagram illustrating a mobile device, according to an example embodiment.

FIG. 15 is a block diagram illustrating a mobile device 1500, according to an example embodiment. The mobile device 1500 may include a processor 1502. The processor 1502 may be any of a variety of different types of commercially available processors suitable for mobile devices (for example, an XScale architecture microprocessor, a microprocessor without interlocked pipeline stages (MIPS) architecture processor, or another type of processor 1502). A memory 1504, such as a random access memory (RAM), a flash memory, or other type of memory, is typically accessible to the processor 1502. The memory 1504 may be adapted to store an operating system (OS) 1506, as well as applications 1508, such as a mobile location-enabled application that may provide location-based services (LBSs) to a user. The processor 1502 may be coupled, either directly or via appropriate intermediary hardware, to a display 1510 and to one or more input/output (I/O) devices 1512, such as a keypad, a touch panel sensor, a microphone, and the like. Similarly, in some embodiments, the processor 1502 may be coupled to a transceiver 1514 that interfaces with an antenna 1516. The transceiver 1514 may be configured to both transmit and receive cellular network signals, wireless data signals, or other types of signals via the antenna 1516, depending on the nature of the mobile device 1500. Further, in some configurations, a GPS receiver 1518 may also make use of the antenna 1516 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors 1502 may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field-programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure the processor 1502, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 1502 that are temporarily configured (e.g., by software) or permanently configured to perform the relevant operations. Whether temporarily or permanently configured, such processors 1502 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 1502 or processor-implemented modules. The performance of certain of the operations may be distributed among the one or more processors 1502, not only residing within a single machine, but deployed across a number of machines. In some example embodiments, the processor 1502 or processors 1502 may be located in a single location (e.g., within a home environment, an office environment, or a server farm), while in other embodiments the processors 1502 may be distributed across a number of locations.

The one or more processors 1502 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 1502, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 1502 executing a computer program to perform functions by operating on input data and generating output. Method operations can also be performed by, and apparatus of example embodiments may be implemented as, special-purpose logic circuitry, e.g., a field-programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 1502), or in a combination of permanently and temporarily configured hardware may be a design choice. Below are set out hardware (e.g., machine) and software architectures that may be deployed, in various example embodiments.

Example Machine Architecture and Machine-readable Medium

Figure 16:
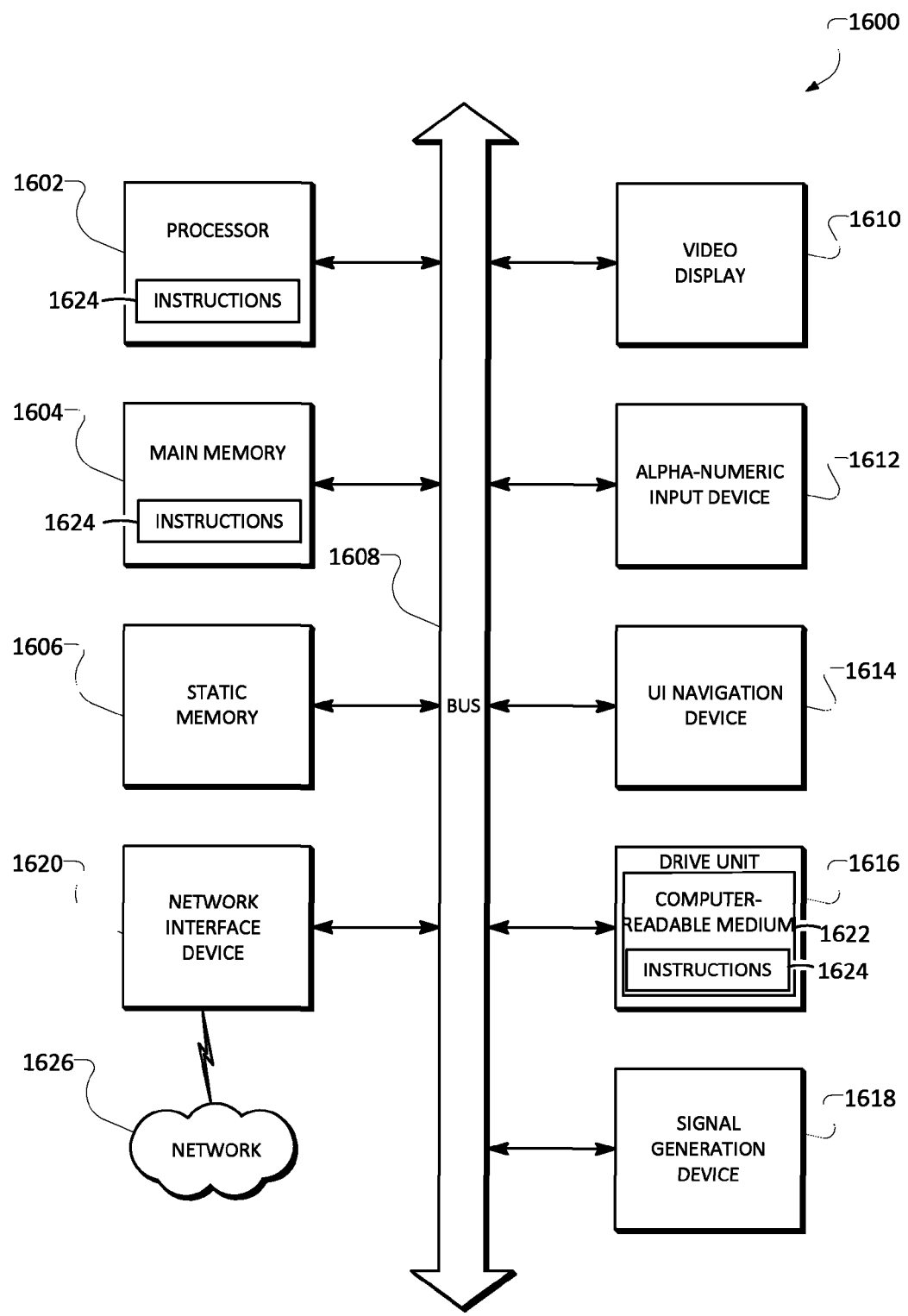
FIG. 16 is a block diagram of a machine in the example form of a computer system within which instructions may be executed for causing the machine to perform any one or more of the methodologies discussed herein.

FIG. 16 is a block diagram of a machine in the example form of a computer system 1600 within which instructions 1624 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU), a graphics processing unit (GPU), or both), a main memory 1604 and a static memory 1606, which communicate with each other via a bus 1608. The computer system 1600 may further include a video display 1610 (e.g., a liquid crystal display (LCD) or a cathode ray tube (CRT)). The computer system 1600 also includes an alphanumeric input device 1612 (e.g., a keyboard or a touch-sensitive display screen), a user interface (UI) navigation (e.g., cursor control) device 1614 (e.g., a mouse), a drive unit 1616, a signal generation device 1618 (e.g., a speaker) and a network interface device 1620.

Machine-readable Medium

The drive unit 1616 includes a computer-readable medium 1622 on which is stored one or more sets of data structures and instructions 1624 (e.g., software) embodying or utilized by any one or more of the methodologies or functions described herein. The instructions 1624 may also reside, completely or at least partially, within the main memory 1604 and/or within the processor 1602 during execution thereof by the computer system 1600, the main memory 1604 and the processor 1602 also constituting computer-readable media 1622.

While the computer-readable medium 1622 is shown in an example embodiment to be a single medium, the term "computer-readable medium" may include a single medium or multiple media (e.g., a centralized or distributed database, and/or associated caches and servers) that store the one or more instructions 1624 or data structures. The term "computer-readable medium" shall also be taken to include any tangible medium that is capable of storing, encoding or carrying instructions 1624 for execution by the machine and that cause the machine to perform any one or more of the methodologies of the present disclosure, or that is capable of storing, encoding or carrying data structures utilized by or associated with such instructions 1624. The term "computer-readable medium" shall accordingly be taken to include, but not be limited to, solid-state memories, and optical and magnetic media. Specific examples of computer-readable media 1622 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1624 may further be transmitted or received over a network 1626 using a transmission medium. The instructions 1624 may be transmitted using the network interface device 1620 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMAX networks). The term "transmission medium" shall be taken to include any intangible medium that is capable of storing, encoding or carrying instructions 1624 for execution by the machine, and includes digital or analog communications signals or other intangible media to facilitate communication of such software.

Although the inventive subject matter has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
    an open time-series database;
    a scheduler;
    a monitoring agent executable by one or more processors and configured to monitor clusters of nodes in a network and store monitored data in the open time-series database;
    an offline training module comprising:
        a data collection and preprocessing module configured to collect first data from the open time-series database and to label the first data as training data; and
        a machine learning model building module configured to build a model through machine learning using the training data;
    a real-time testing module comprising:
        a data collection and preprocessing module configured to collect second data from the open time-series database and to leave the second data as unlabeled; and
        a predictive model engine configured to compute anomalies in the unlabeled data using the model built by the machine learning model and to output prediction outcomes and metrics to the scheduler; and
    the scheduler configured to use the prediction outcomes and metrics to move or reduce workloads from problematic clusters of nodes in the network.

2. The system of claim 1, wherein the scheduler comprises an extension to a YARN scheduler.

3. The system of claim 2, wherein the extension comprises:
    a scheduler feedback language parser configured to parse feedback information written in a scheduler feedback language.

4. The system of claim 2, wherein the extension comprises:
    a feedback agent configured to interact with the predictive model engine to receive feedback information.

5. The system of claim 2, wherein the extension comprises:
    a feedback policy module configured to take scheduling rules and generate an execution plan based on the scheduling rules and feedback from a feedback agent.

6. The system of claim 2, wherein the extension comprises:
    an action executor configured to execute a scheduling created based on feedback from a feedback agent.

7. The system of claim 1, wherein the scheduler is contained in a resource manager.

8. A method comprising:
    monitoring clusters of nodes in a network;
    storing monitored data in an open time-series database;
    collecting data from the open time-series database and labeling it as training data;
    building a model through machine learning using the training data;
    collecting additional data from the open time-series database;
    leaving the additional data as unlabeled;
    compute anomalies in the unlabeled data using the model, producing prediction outcomes and metrics; and
    using the prediction outcomes and metrics to move or reduce workloads from problematic clusters of nodes in the network.

9. The method of claim 8, wherein the computing anomalies includes building a model using a trading data set using Multivariate Gaussian Distribution.

10. The method of claim 8, wherein the computing anomalies includes applying a Matthews Correlation coefficient as a threshold to reduce false positives.

11. The method of claim 8, wherein the computing anomalies includes applying a half total error rate as a threshold to reduce false positives.

12. The method of claim 8, wherein the computing anomalies includes defining a function to calculate an anomaly score of data nodes.

13. The method of claim 8, wherein the using the prediction outcomes includes:
    detecting that a data node is anomalous;
    in response to the detection that the data node is anomalous, locating one or more features contributing to the anomaly.

14. The method of claim 13, wherein the locating includes deducing one or more features contributing to the anomaly using a single-variate Gaussian Distribution Function.

15. A non-transitory machine-readable storage medium embodying instructions which, when executed by a machine, cause the machine to execute operations comprising:

monitoring clusters of nodes in a network;

storing monitored data in an open time-series database;

collecting data from the open time-series database and labeling it as training data;

building a model through machine learning using the training data;

collecting additional data from the open time-series database;

leaving the additional data as unlabeled;

computing anomalies in the unlabeled data using the model, producing prediction outcomes and metrics; and using the prediction outcomes and metrics to move or reduce workloads from problematic clusters of nodes in the network.

16. The non-transitory machine-readable storage medium of claim 15, wherein the computing anomalies includes building a model using a trading data set using Multivariate Gaussian Distribution.

17. The non-transitory machine-readable storage medium of claim 15, wherein the computing anomalies includes applying a Matthews Correlation coefficient as a threshold to reduce false positives.

18. The non-transitory machine-readable storage medium of claim 15, wherein the computing anomalies includes applying a half total error rate as a threshold to reduce false positives.

19. The non-transitory machine-readable storage medium of claim 15, wherein the computing anomalies includes defining a function to calculate an anomaly score of data nodes.

20. The non-transitory machine-readable storage medium of claim 15, wherein the using the prediction outcomes includes:

detecting that a data node is anomalous;

in response to the detection that the data node is anomalous, locating one or more features contributing to the anomaly.

* * * * *

UNITED STATES PATENT AND TRADEMARK OFFICE
CERTIFICATE OF CORRECTION

| | |
|---|---|
| PATENT NO. | : 9,699,049 B2 |
| APPLICATION NO. | : 14/586381 |
| DATED | : July 4, 2017 |
| INVENTOR(S) | : Chaitali Gupta et al. |

It is certified that error appears in the above-identified patent and that said Letters Patent is hereby corrected as shown below:

On the Title Page

In item (57), in Column 2, in "Abstract", Line 10, after "and" insert -- metrics are used to move or reduce workloads from problematic clusters of nodes in --.

In the Claims

In Column 22, Line 3, in Claim 17, delete "coefficiant" and insert -- coefficient --, therefor.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*